E. L. CORWIN.
BOTTOM DUMP MECHANISM FOR VEHICLE BODIES.
APPLICATION FILED SEPT. 14, 1916.
1,245,686.
Patented Nov. 6, 1917.
Fig. 1.
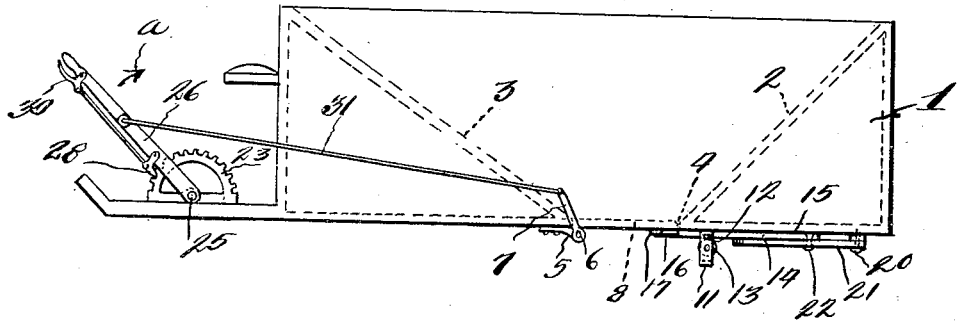
Fig. 2.
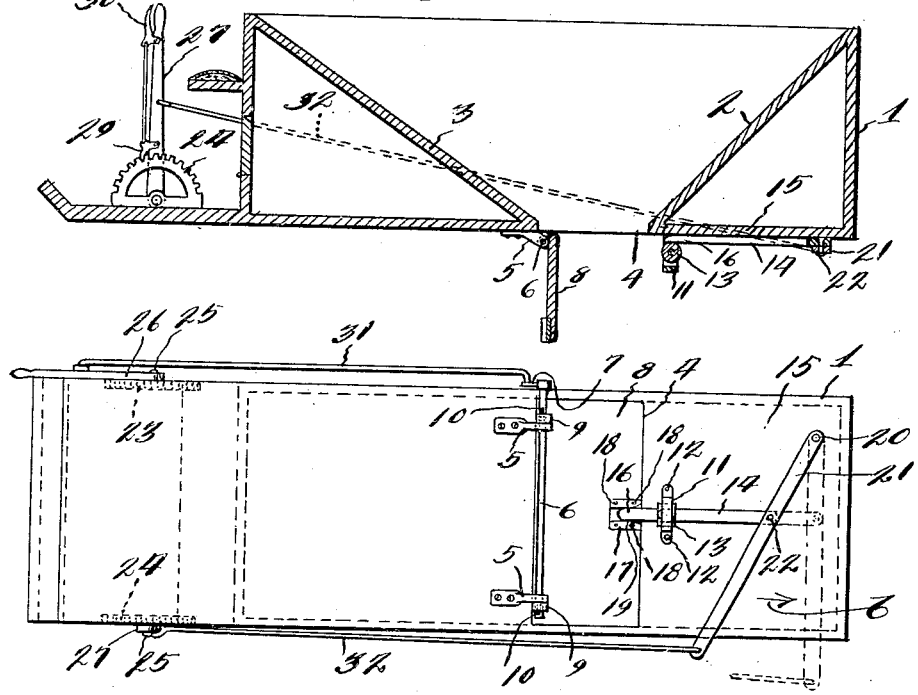
Fig. 3.
Inventor
E. L. Corwin
Witnesses
By
D. Swift & Co.
Attorneys

UNITED STATES PATENT OFFICE.

ELLIS L. CORWIN, OF KEY, OHIO.

BOTTOM-DUMP MECHANISM FOR VEHICLE-BODIES.

1,245,686.      Specification of Letters Patent.      Patented Nov. 6, 1917.

Application filed September 14, 1916. Serial No. 120,129.

*To all whom it may concern:*

Be it known that I, ELLIS L. CORWIN, a citizen of the United States, residing at Key, in the county of Belmont, State of Ohio, have invented a new and useful Bottom-Dump Mechanism for Vehicle-Bodies; and I do hereby declare the following to be a full, clear, and exact description of the invention, such as will enable others skilled in the art to which it appertains to make and use the same.

This invention relates to an improved bottom dump mechanism for truck and vehicle bodies, and one of the objects of the invention is to provide an improved device of this kind, which is simple, efficient and practical in construction, and comprises improved features, whereby produce, such as corn, potatoes, beets, and the like, and other material, such as coal, sand, bricks, rock, gravel, and the like, may be easily and quickly dumped.

Another object of the invention is the provision of means whereby the bottom dumping door may be opened or closed, and latched or unlatched from the front end of the body of the vehicle.

In practical fields, the details of construction may necessitate alterations falling within the scope of what is claimed.

The invention comprises further features and combinations of parts, as hereinafter set forth, shown in the drawings, and claimed.

In the drawings:—

Figure 1 is a view in side elevation of a truck or vehicle body showing the improved bottom dump mechanism as applied thereto.

Fig. 2 is a sectional view longitudinally through the body.

Fig. 3 is a bottom plan view of the body.

Referring more especially to the drawings, 1 designates a truck or vehicle body, which may be of any suitable construction, and provided with inclined bottom boards 2 and 3. The body is provided with an opening 4 where the boards 2 and 3 terminate, and journaled in bearings 5 secured to the bottom of the body near one side of the opening 4, is a rod 6, to one end of which an arm 7 is fixed. A bottom dump door 8 is provided for closing the opening 4, and the ears 9 of this door 8 are keyed by the feathers 10 to the rod 6, whereby as the rod 6 is rocked, the door may be opened or closed. An arched bracket or keeper 11 is fixed at 12 to the rear portion of the bottom of the body, and in this keeper a roller 13 is journaled. A locking bolt or bar 14 is arranged adjacent the under surface of the bottom part 15, and engages the roller 13, and its free end 16 is designed to engage a second keeper plate 17, which is secured at 18 to the underface of the dump door 8. This second keeper plate is embedded in the under surface of the dump door, and is provided with a groove 19, to receive the free end 16 of the bolt. Each wall of the groove 19 at one end is curved laterally. In other words, the walls of the groove diverge at one end, so that the bolt or bar 14 may easily enter the groove, when locking the dump door. Secured to the bottom portion 15 of the body by means of the pivot pin 20 is a lever 21, to which the bolt or bar 14 is connected by the pivot pin 22. On the forward end of the body adjacent the sides thereof two segment racks 23 and 24 are secured, and pivoted at 25 to these racks are the levers 26 and 27, having the dogs 28 and 29 (operated by the hand grips 30) to engage the teeth of said racks to hold the levers in their adjusted positions. The lever 26 has a rod 31 connected to it, which rod in turn is pivoted to the arm 7 of the rod 6, so that by moving the lever in the direction of the arrow $a$, the bottom dump door 8 will be thrown open, allowing the material to pass out through the opening of the body 4. A rod 32 has its forward end connected to the lever 27 and its rear end to the free end of the lever 21, so that by moving the lever 27 rearwardly, oscillating the lever 21 in the direction of the arrow $b$, the bolt or bar 14 will be withdrawn from the second keeper plate 17, thereby unlocking the dump door 8, to allow the same to be opened by the manipulation of the lever 26. It is to be noted that the dump door may be unlocked, opened, and then closed, and locked from the front end of the body of the truck or other vehicle.

The invention having been set forth, what is claimed as new and useful is:—

1. In a bottom dump, a vehicle body having a transversely disposed bottom opening, a gravity actuated swinging closure for said opening, and having countersunk in its under face a keeper plate provided with a channel, a U-shaped bracket secured to the under face of the body and provided with an anti-frictional roller, a lever pivoted to the bottom of the body, a bolt bar pivoted to said lever and movable through the bracket and engaging said roller, between the roller and the bottom of the body, whereby, as the lever is moved in one direction, the extremity of the bolt bar will engage between the walls of the channel of the keeper plate when the closure is shut, and means for actuating said lever.

2. In combination, a door, a container having an opening in which said door fits, a keeper having a channel countersunk in the outer face of said door adjacent its free edge, a U-shaped bracket secured to the container and having an anti-frictional roller journaled therein, a lever pivoted to said container, a bolt bar pivoted to the lever and passing through the bracket, engaging between the roller and the face of the container, whereby, as the lever is oscillated, said bolt bar will move loosely through the bracket, the ends of the side walls of the channel of the keeper being curved outwardly, whereby the extremity of the loosely guided bolt bar will be guided into said channel when the door is closed, and means for actuating the said lever, the end of the upper face of the bolt bar adjacent the keeper engaging end of said bar being curved off, whereby the door is forced closely into its opening, should the same fail to fully engage into its opening.

In testimony whereof I have signed my name to this specification in the presence of two subscribing witnesses.

ELLIS L. CORWIN.

Witnesses:
D. W. COOPER,
KENNETH E. COOPER.

Copies of this patent may be obtained for five cents each, by addressing the "Commissioner of Patents, Washington, D. C."